US008548988B2

(12) United States Patent
Varadarajan et al.

(10) Patent No.: US 8,548,988 B2
(45) Date of Patent: Oct. 1, 2013

(54) SYSTEM AND METHOD FOR COMPARING UNIVERSITIES BASED ON THEIR UNIVERSITY MODEL GRAPHS

(75) Inventors: Sridhar Varadarajan, Bangalore (IN); Srividya Gopalan, Bangalore (IN); Preethy Iyer, Bangalore (IN)

(73) Assignee: SRM Institute of Science and Technology, West Mambalam (IN)

( * ) Notice: Subject to any disclaimer, the term of this patent is extended or adjusted under 35 U.S.C. 154(b) by 79 days.

(21) Appl. No.: 13/025,355

(22) Filed: Feb. 11, 2011

(65) Prior Publication Data
US 2012/0130998 A1    May 24, 2012

(30) Foreign Application Priority Data
Nov. 22, 2010 (IN) .............................. 3492/CHE/2010

(51) Int. Cl.
*G06F 17/30* (2006.01)
*G06F 7/00* (2006.01)
(52) U.S. Cl.
USPC ............... 707/722; 707/723; 706/45; 706/46; 706/48
(58) Field of Classification Search
None
See application file for complete search history.

(56) References Cited

U.S. PATENT DOCUMENTS

| 7,996,814 | B1* | 8/2011 | Qureshi et al. | 717/120 |
|---|---|---|---|---|
| 2004/0034651 | A1* | 2/2004 | Gupta et al. | 707/102 |
| 2007/0078869 | A1* | 4/2007 | Carr et al. | 707/100 |
| 2008/0215510 | A1* | 9/2008 | Regli et al. | 706/12 |
| 2009/0214117 | A1 | 8/2009 | Ma et al. | |
| 2009/0324107 | A1 | 12/2009 | Walch et al. | |
| 2010/0153324 | A1 | 6/2010 | Downs et al. | |
| 2010/0332474 | A1* | 12/2010 | Birdwell et al. | 707/737 |
| 2010/0332475 | A1* | 12/2010 | Birdwell et al. | 707/737 |
| 2011/0173189 | A1* | 7/2011 | Singh et al. | 707/722 |

OTHER PUBLICATIONS

"Graph Comparison Using Fine Structure Analysis"; O. Macindoe and W. Richards; appeared in proceedings of IEEE SocCom10, #244, 2010.
"Empirical Comparison of Algorithms for Network Community Detection"; Jure Leskovec, Kevin Lang and Michael Mahoney; appeared in the Proceedings of the ACM WWW International conference on World Wide Web (WWW), 2010.
"Extension and Empirical Comparison of Graph-Kernals for the Analysis of Protein Active Sites"; Thomas Fober, Marco Mernberger, Vitalik Melnikov, Ralph Moritz and Eyke Hullermeier; appeared in the Proceedings of the Workshop "Knowledge Discovery, Data M€ ining and Machine Learning 2009", Sep. 2009.

* cited by examiner

*Primary Examiner* — Angelica Ruiz
(74) *Attorney, Agent, or Firm* — Merek, Blackmon & Voorhees, LLC

(57) ABSTRACT

An educational institution (also referred as a university) is structurally modeled using a university model graph. Such a model helps compare educational institutions at various levels—university level, department level, faculty member level, or student level. One of the requirements of comparison is to normalize the similarities and identify and elaborate the differences across multiple educational institutions. A way to achieve this is to model the educational institutions using comparable elements; specifically, the university model graph allows for such comparison as multiple educational institutions are modeled based on the same set of concepts and notions. A system and method for comparing educational institutions based on their respective university model graphs is discussed.

11 Claims, 16 Drawing Sheets

AN EI COMPARISON SYSTEM

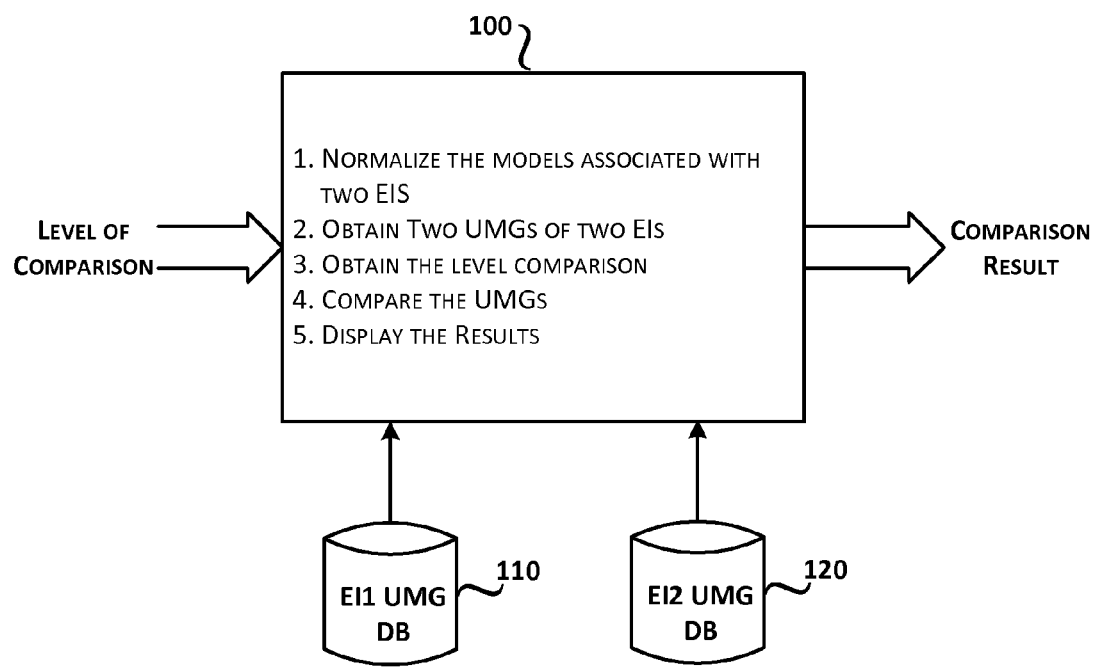
FIG. 1: AN EI COMPARISON SYSTEM

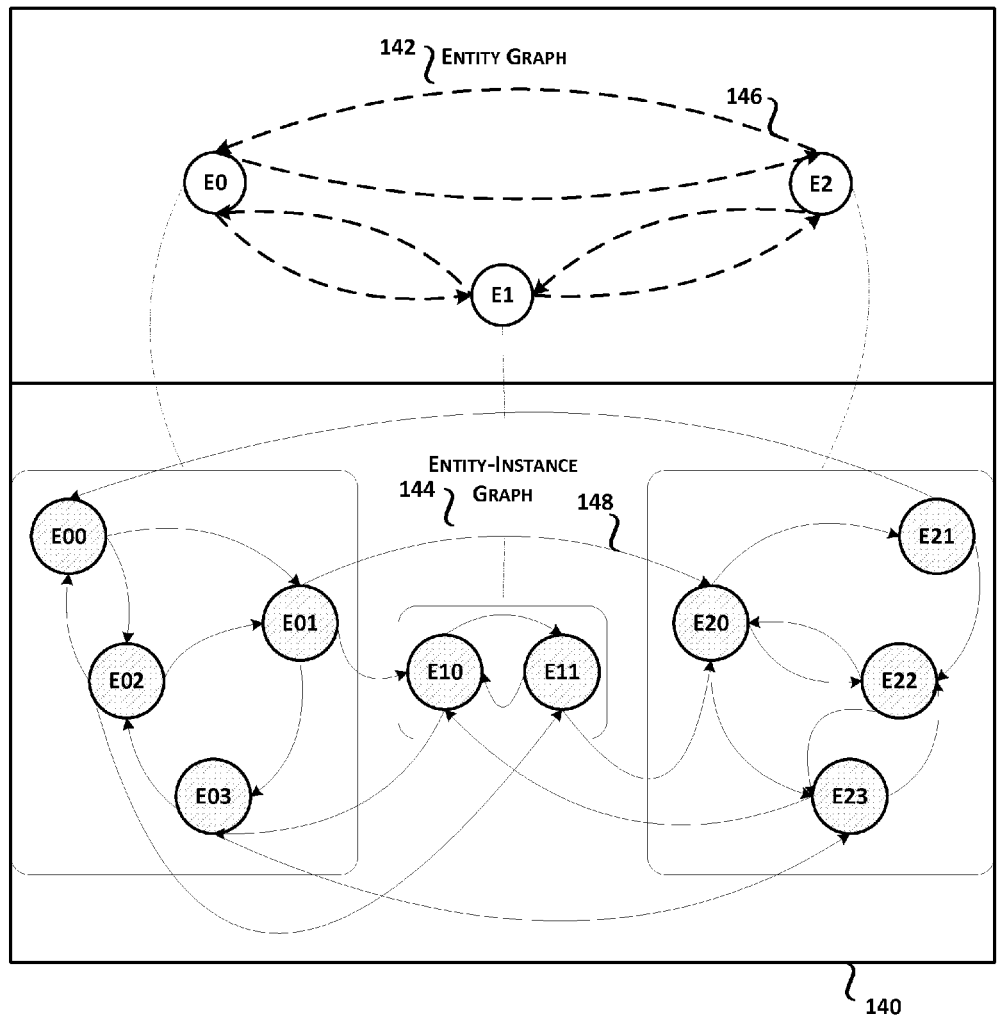
FIG. 1A: AN ILLUSTRATIVE UNIVERSITY MODEL GRAPH

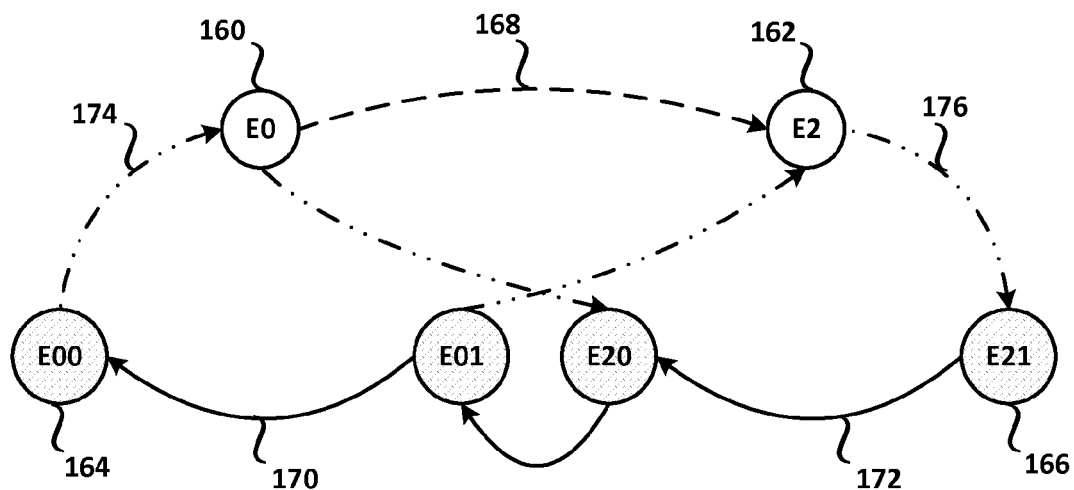
FIG. 1B: THE ELEMENTS OF UNIVERSITY MODEL GRAPH

| TYPICAL ENTITIES OF A UNIVERSITY |
|---|
| 1. UNIVERSITY<br>2. VICE CHANCELLOR<br>3. DIVISION<br>4. CAPITAL ASSET<br>5. ADMISSION UNIT<br>6. DEPARTMENT<br>7. CHAIR-PERSON<br>8. FACULTY MEMBER<br>9. STUDENT<br>10. RESEARCH STUDENT<br>11. COURSE STUDENT<br>12. PRINCIPLE INVESTIGATOR<br>13. LABORATORY<br>14. EQUIPMENT<br>15. STAFF<br>16. LIBRARY<br>17. DEPARTMENT LIBRARY<br>18. BOOK<br>19. E-BOOK<br>20. MAGAZINE<br>.<br>.<br>. |

FIG. 2: A PARTIAL LIST OF ENTITIES OF A UNIVERSITY

KINDS OF COMPARISONS OF TWO UMGs – UMG1 OF EI1 AND UMG2 OF EI2

1. C1 – COMPARISON AT UMG LEVEL: IN THIS CASE, THE TWO UMGs ARE COMPARED HOLISTICALLY TO PROVIDE SUMMARIZED COMPARISON OF THE TWO CORRESPONDING EIs.

2. C2 – COMPARISON AT ABSTRACT NODE LEVEL: GIVEN AN ABSTRACT NODE (OR EQUIVALENTLY, AN ENTITY), PROVIDE THE SUMMARIZED COMPARISON AT THE ENTITY LEVEL FOR THE TWO CORRESPONDING EIs;

3. C3 – COMPARISON AT NODE LEVEL: GIVEN A NODE (OR EQUIVALENTLY, AN ENTITY-INSTANCE), PROVIDE THE SUMMARIZED COMPARISON AT ENTITY-INSTANCE LEVEL FOR THE TWO CORRESPONDING EIs;

4. C4 – COMPARISON AT SUB-GRAPH LEVEL: GIVEN A SET OF ENTITIES AND ENTITY-INSTANCES, COMPARE THE TWO SUB-GRAPHS FROM THE TWO UMGs TO PROVIDE DETAILED COMPARISON FOR THE TWO CORRESPONDING EIs;

5. C5 – COMPARISON BASED ONLY ON THE BASE SCORE (ASSESSMENT) OF THE NODES OF THE TWO UMGs;

6. C6 – COMPARISON BASED ONLY ON THE INFLUENCE VALUE OF THE EDGES OF THE TWO UMGs.

FIG. 3: KINDS OF COMPARISON

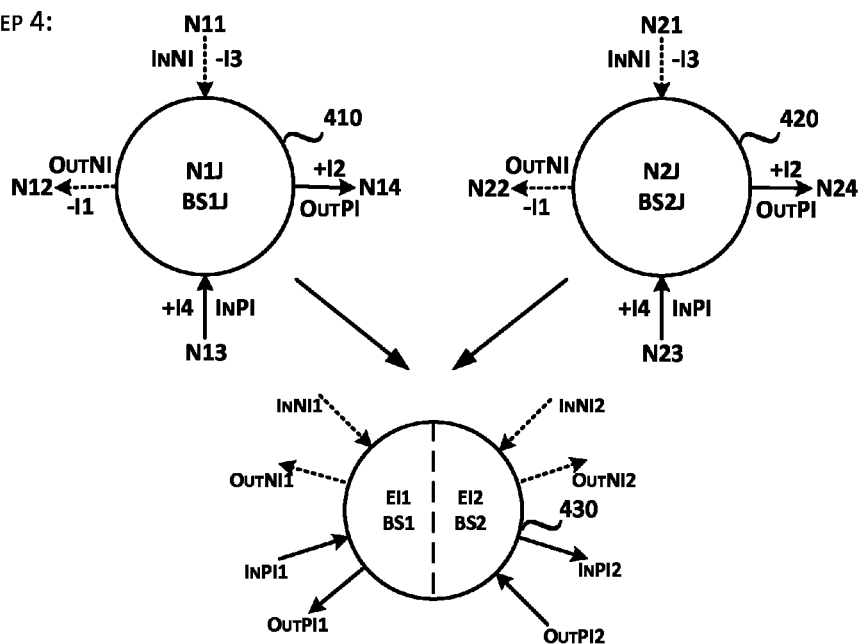
FIG. 4: COMPARISON AT UMG LEVEL

AN APPROACH FOR C1 – COMPARISON AT UMG LEVEL (CONTD.)

STEP 41: CONSIDER A CNODE WITH THE FOLLOWING INFO:
 BS1 AND BS2 – CONSOLIDATED BASE SCORES BASED ON UMG1 AND UMG2 RESPECTIVELY;
 INNI1 AND INNI2 – CONSOLIDATED VALUES OF UMG1 AND UMG2 RESPECTIVELY;
 OUTNI1 AND OUTNI2 – CONSOLIDATED VALUES OF UMG1 AND UMG2 RESPECTIVELY;
 INPI1 AND INPI2 – CONSOLIDATED VALUES OF UMG1 AND UMG2 RESPECTIVELY;
 OUTPI1 AND OUTPI2 – CONSOLIDATED VALUES OF UMG1 AND UMG2 RESPECTIVELY;

ADD BS1J TO BS1 AND BS2J TO BS2;
 ADD INNI1J TO INNI1 AND INNI2J TO INNI2;
 ADD OUTNI1J TO OUTNI1 AND OUTNI2J TO OUTNI2;
 ADD INPI1J TO INPI1 AND INPI21 TO INPIJ;
 ADD OUTPI1J TO OUTPI1 AND OUTPI2J TO OUTPI2;

STEP 5: FOR EACH OF NON-MATCHING NODE N1J OF UMG1,
 REPEAT STEP 4 TO CREATE CNMNODE1;
 FOR EACH OF NON-MATCHING NODE N2J OF UMG2,
 REPEAT STEP 4 TO CREATE CNMNODE2;

STEP 6: DISPLAY CNODE, CNMNODE1, AND CNMCNODE2:

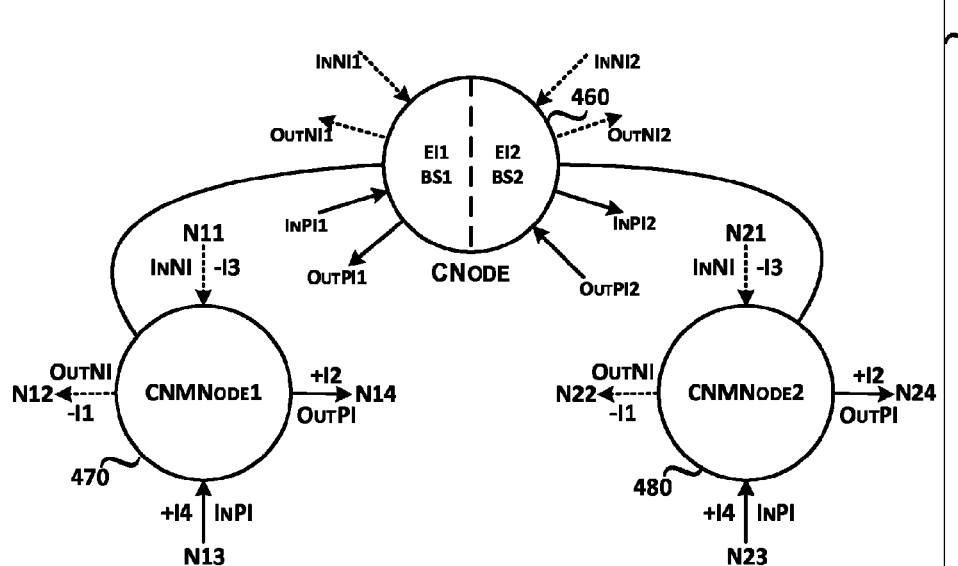

STEP 7: END.

FIG. 4A: COMPARISON AT UMG LEVEL (CONTD.)

AN APPROACH FOR C2 – COMPARISON AT ENTITY LEVEL

STEP 1: INPUT – AN ABSTRACT NODE AN (ENTITY);
INPUT – UMG1 ASSOCIATED WITH EI1 AND UMG2 ASSOCIATED WITH EI2;
OUTPUT – RESULT OF COMPARISON;

APPROACH: COMPUTE E-5 TUPLE WITH RESPECT TO UMG1 AND UMG2;

STEP 2: FOR EACH INSTANCE NODE OF AN BASED ON UMG1,
DETERMINE BS, InNI, OutNI, InPI, AND OutPI;

STEP 3: CLUSTER BS ASSOCIATED WITH ALL THE INSTANCES;
SELECT THE MOST POPULATED CLUSTER;
DETERMINE THE CENTROD OF THE MOST POPULATED CLUSTER;
SET THE CENTROID AS BS1;
SIMILARLY, CLUSTER ALL InNI'S AND SET THE CENTROID OF THE MOST POPULAR CLUSTER AS InNI1;
SIMILARLY, COMPUTE OutNI1, InPI1, AND OutPI1;

STEP 4: FOR EACH INSTANCE NODE OF AN BASED ON UMG2,
DETERMINE BS, InNI, OutNI, InPI, AND OutPI;

STEP 5: AS IN STEP 3, CLUSTER AND COMPUTE BS2, InNI2, OutNI2, InPI2, AND OutPI2;

STEP 6: DISPLAY CAN (COMPARISON OF AN) COMPRISING
BS1, InNI1, OutNI1, InPI1, AND OutPI1, AND
BS2, InNI1, OutNI2, InPI2, AND OutPI2.

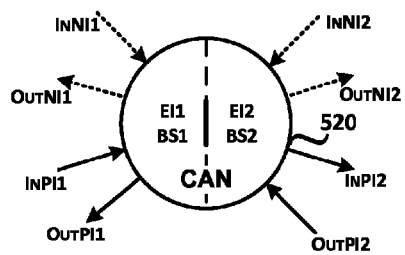

STEP 7: END.

FIG. 5: COMPARISON AT ABSTRACT NODE LEVEL

An Approach for C3 – Comparison at Entity-Instance Level

Step 1: Input – A node N (Entity-Instance);
Input – UMG1 associated with EI1 and UMG2 associated with EI2;
Output – Result of Comparison;

Approach: Compute EI-5-Tuple for N with respect to UMG1 and UMG2;

Step 2: Compute the set of Incoming negative influence values of N of UMG1;

Step 3: Cluster the set and determine the centroid of the most populated cluster; Set the centroid cInNI1;
Similarly, compute cOutNI1 based on the set of Outgoing negative influence values;
And, compute cInPI2 and cOutPI1;
Obtain base score BS1 of N;

Step 4: Repeat Steps 2 and 3 to compute cInNI2, cOutNI2, cInPI2, cOutPI2, and BS2;

Step 5: Display the results:

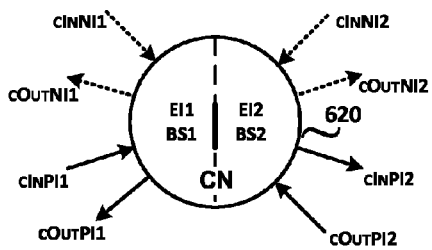

Step 6: END.

Fig. 6: Comparison at Node Level

AN APPROACH FOR C4 – COMPARISON AT SUB-GRAPH LEVEL

STEP 1: INPUT – A SUB-GRAPH IN TERMS OF A SET S OF ENTITIES AND ENTITY-INSTANCES;
INPUT – UMG1 ASSOCIATED WITH EI1 AND UMG2 ASSOCIATED WITH EI2;
OUTPUT – COMPARISON RESULT;

STEP 2: FOR EACH ENTITY-INSTANCE N OF S OF UMG1,
COMPUTE EI-5-TUPLE;
FOR EACH ENTITY OF AN OF S OF UMG1,
COMPUTE E-5-TUPLE;

STEP 3: FOR EACH AN OF S OF UMG1,
DETERMINE ENTITY-INSTANCES THAT ARE AN INSTANCE OF AN;
COMPUTE CLUSTERED CENTROID BASED CEI-5-TUPLE BASED ON THE ENTITY-INSTANCES;
COMBINE CEI-5-TUPLE AND E-5-TUPLE TO GENERATE UPDATED E-5-TUPLE OF AN;

AT THIS STAGE, THERE ARE ENTITIES WITH THEIR UPDATED 5-TUPLES;

STEP 4: COMBINE THE ENTITIES IN A HIERARCHICAL MANNER AND COMPUTE THE UPDATED 5-TUPLES;
AT THIS STAGE, THERE ARE DISTINCT ENTITIES (THAT ARE NOT RELATED HIERARCHICALLY) WITH
THE UPDATED 5-TUPLES;

STEP 5: REPEAT STEPS 2 AND 3 WITH RESPECT TO UMG2;

STEP 6: DISPLAY THE RESULTS:

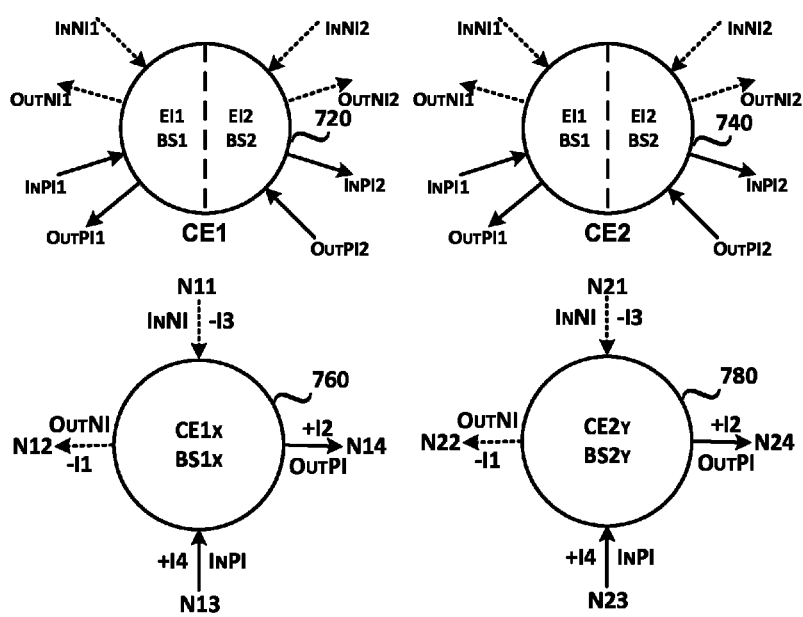

STEP 7: END.

FIG. 7: COMPARISON AT SUB-GRAPH LEVEL

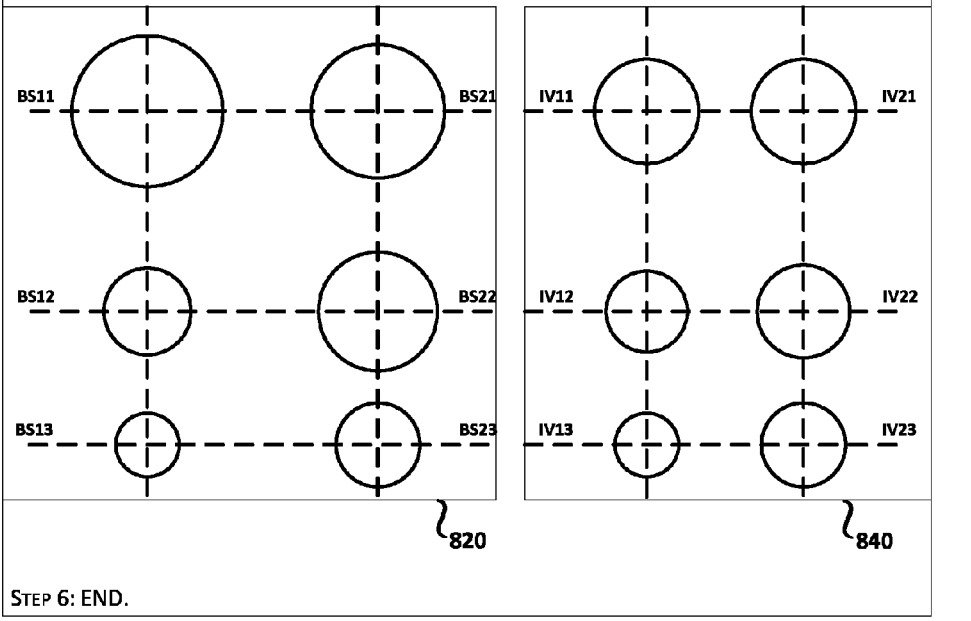
FIG. 8: COMPARISON BASED ON BASE SCORES AND INFLUENCE VALUES

AN APPROACH FOR MODEL NORMALIZATION

1. THERE ARE THREE KINDS OF MODELS: PARAMETRIC MODEL, HIERARCHICAL MODEL, AND ACTIVITY BASED MODEL;
2. ONE OF THESE THREE MODELS IS ASSOCIATED WITH EVERY ABSTRACT NODE OF UMG;
3. MODEL NORMALIZATION IS THE PROCESS OF EQUALIZING THE MODELS OF AN ABSTRACT NODE OF UMG1 AND THE CORRESPONDING NODE OF UMG2;
4. THE BASE SCORES (ASSESSMENTS) AND INFLUENCE VALUES ARE RECOMPUTED BASED ON THE NORMALIZED MODELS TO ENSURE THAT THE COMPARISONS ARE APPROPRIATE.
5. CONSIDER PARAMETRIC MODEL (PM):
   A PM CONSISTS OF A SET OF PARAMETERS (SP);
   EACH PARAMETER CONSISTS OF A STANDARD NAME (BASED ON DOMAIN ANALYSIS) AND A FUNCTION;
   IT IS ASSUMED THAT AS THE PARAMETER NAMES ARE STANDARD, THE ASSOCIATED FUNCTIONS ACROSS UMGS ARE EQUIVALENT FOR THE SAME PARAMETER NAME;
   STEPS INVOLVED IN PM NORMALIZATION:

STEP 1: INPUT – UMG1 ASSOCIATED WITH EI1 AND UMG2 ASSOCIATED WITH EI2;
OUTPUT – THE NORMALIZED MODELS OF UMG1 AND UMG2;

STEP 2: OBTAIN A NODE / ABSTRACT NODE N1 OF UMG1;
DETERMINE THE CORRESPONDING NODE N2 OF UMG2;

STEP 3: OBTAIN PM1 ASSOCIATED WITH N1 AND PM2 ASSOCIATED WITH N2;

STEP 4: LET SP1 BE THE SET OF PARAMETERS ASSOCIATED WITH PM1; SIMILARLY IS SP2;

STEP 5: FOR EACH PARAMETER P1 OF SP1,
CHECK IF AN EQUIVALENT PARAMETER P2 OF SP2 CAN BE DETERMINED;
IF NOT, REMOVE P1;

STEP 6: REMOVE THOSE PARAMETERS FROM SP2 THAT DID NOT MATCH WITH ANY PARAMETER OF SP1;

STEP 7: END.

FIG. 9: MODEL NORMALIZATION – PARAMETRIC MODEL

AN APPROACH FOR MODEL NORMALIZATION (CONTD.)
HIERARCHICAL MODEL NORMALIZATION

STEP 1: INPUT – UMG1 ASSOCIATED WITH EI1 AND UMG2 ASSOCIATED WITH EI2;
OUTPUT – THE NORMALIZED MODELS OF UMG1 AND UMG2;

STEP 2: OBTAIN A NODE / ABSTRACT NODE N1 OF UMG1;
DETERMINE THE CORRESPONDING NODE N2 OF UMG2;

STEP 3: OBTAIN HM1 (A HIERARCHICAL MODEL) ASSOCIATED WITH N1 AND HM2 (A HIERARCHICAL MODEL) ASSOCIATED WITH N2;

STEP 4: LET SN1 BE THE SET OF NODES ASSOCIATED WITH HM1; SIMILARLY IS SN2;

STEP 5: OBTAIN THE ROOT R1 OF HM1, AND THE ROOT R2 OF HM2;
FOR EACH CHILD NODE OF HM1,
CHECK IF AN EQUIVALENT CHILD NODE OF R2 CAN BE DETERMINED;
IF NOT, REMOVE THE CHILD NODE FROM HM1;

STEP 51: REMOVE THOSE CHILD NODES FROM R2 THAT DID NOT MATCH WITH ANY OF THE CHILD NODES OF R1;

STEP 6: REPEAT STEP 5 FOR EACH OF THE NON-ROOT NODES OF HM1;

STEP 7: FOR EACH OF THE LEAF-NODES LN1 OF HM1,
CHECK IF AN EQUIVALENT LEAF NODE OF HM2 CAN BE DETERMINED;
IF NOT REMOVE LN1 FROM HM1;
IF SO,
LET LN2 BE THE CORRESPONDING EQUIVALENT LEAF-NODE OF HM2;
DETERMINE PM1 ASSOCIATED WITH LN1 WITH SP1 AS THE SET OF PARAMETERS;
DETERMINE PM2 ASSOCIATED WITH LN2 WITH SP2 AS THE SET OF PARAMETERS;

STEP 71: FOR EACH PARAMETER P1 OF SP1,
CHECK IF AN EQUIVALENT PARAMETER P2 OF SP2 CAN BE DETERMINED;
IF NOT, REMOVE P1;

STEP 72: REMOVE THOSE PARAMETERS FROM SP2 THAT DID NOT MATCH WITH ANY PARAMETER OF SP1;

STEP 8: END.

FIG. 9A: MODEL NORMALIZATION – HIERARCHICAL MODEL   920

AN APPROACH FOR MODEL NORMALIZATION (CONTD.)
ACTIVITY BASED MODEL NORMALIZATION

STEP 1: INPUT – UMG1 ASSOCIATED WITH EI1 AND UMG2 ASSOCIATED WITH EI2;
OUTPUT – THE NORMALIZED MODELS OF UMG1 AND UMG2;

STEP 2: OBTAIN A NODE / ABSTRACT NODE N1 OF UMG1;
DETERMINE THE CORRESPONDING NODE N2 OF UMG2;

STEP 3: OBTAIN AM1 (AN ACTIVITY BASED MODEL) ASSOCIATED WITH N1 AND AM2 (AN ACTIVITY BASED MODEL) ASSOCIATED WITH N2;

STEP 4: LET SN1 BE THE SET OF NODES ASSOCIATED WITH AM1; SIMILARLY IS SN2;

STEP 5: OBTAIN THE ROOT R1 OF AM1, AND THE ROOT R2 OF AM2;
FOR EACH CHILD NODE OF AM1,
CHECK IF AN EQUIVALENT CHILD NODE OF R2 CAN BE DETERMINED;
IF NOT, REMOVE THE CHILD NODE FROM AM1;

STEP 51: REMOVE THOSE CHILD NODES FROM R2 THAT DID NOT MATCH WITH ANY OF THE CHILD NODES OF R1;

STEP 6: REPEAT STEP 5 FOR EACH OF THE NON-ROOT NODES OF AM1;

STEP 7: FOR EACH OF THE LEAF-NODES LN1 OF AM1,
CHECK IF AN EQUIVALENT LEAF NODE OF AM2 CAN BE DETERMINED;
IF NOT REMOVE LN1 FROM AM1;
IF SO,
LET LN2 BE THE CORRESPONDING EQUIVALENT LEAF-NODE OF AM2;
DETERMINE PM1 ASSOCIATED WITH LN1 WITH SP1 AS THE SET OF PARAMETERS;
DETERMINE PM2 ASSOCIATED WITH LN2 WITH SP2 AS THE SET OF PARAMETERS;

STEP 71: FOR EACH PARAMETER P1 OF SP1,
CHECK IF AN EQUIVALENT PARAMETER P2 OF SP2 CAN BE DETERMINED;
IF NOT, REMOVE P1;

STEP 72: REMOVE THOSE PARAMETERS FROM SP2 THAT DID NOT MATCH WITH ANY PARAMETER OF SP1;

STEP 8: END.

FIG. 9B: MODEL NORMALIZATION – ACTIVITY BASED MODEL     940

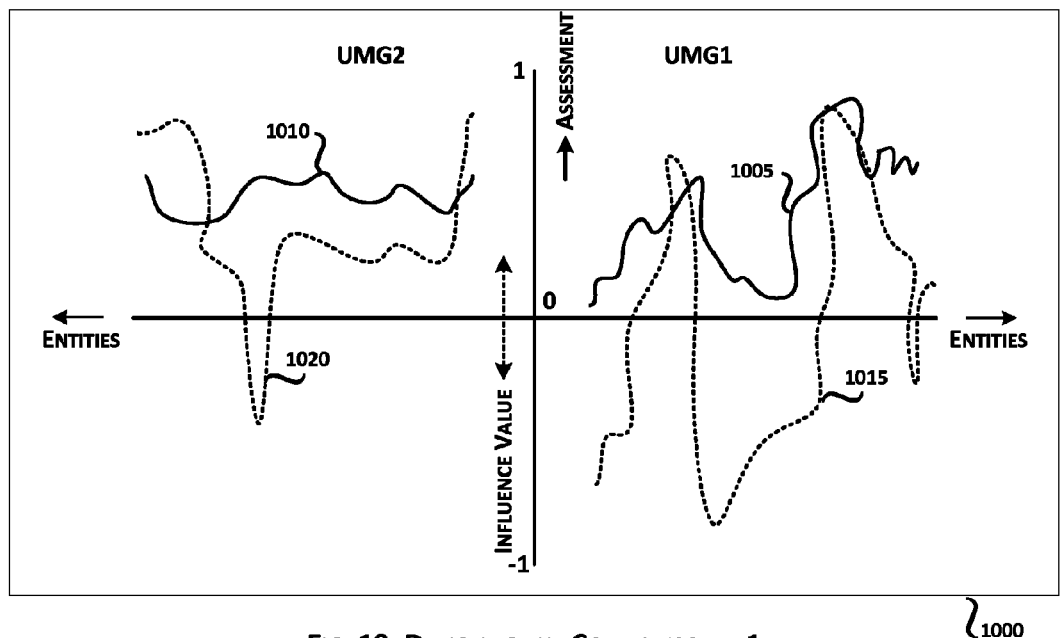
FIG. 10: DEPICTING THE COMPARISON – 1
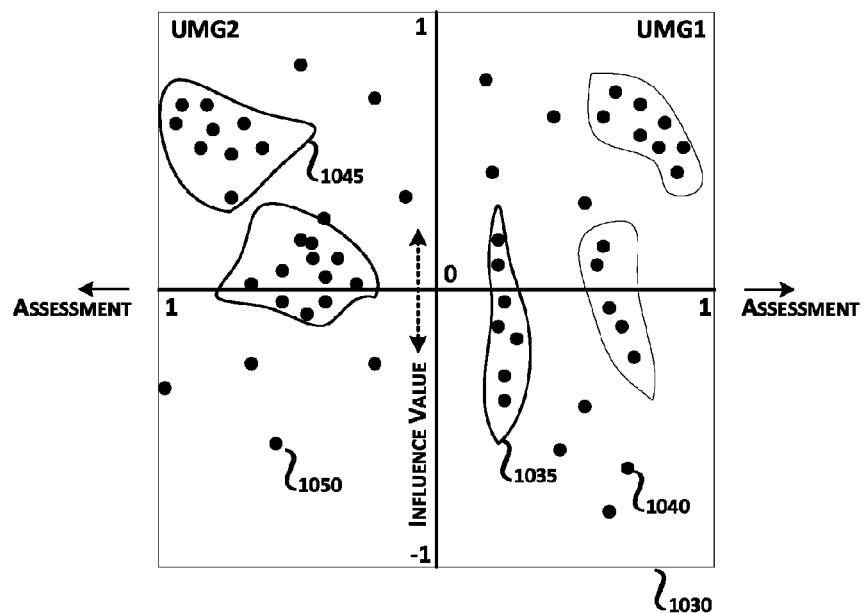
FIG. 10A: DEPICTING THE COMPARISON – 2

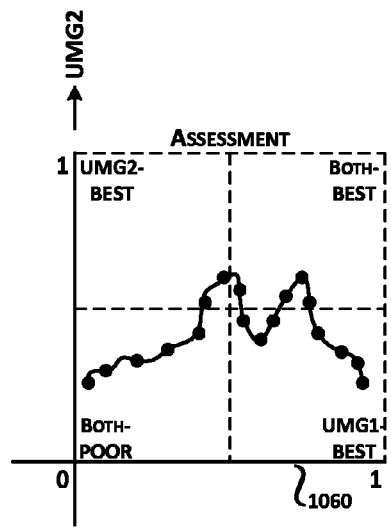
FIG. 10B: DEPICTING THE COMPARISON – 3
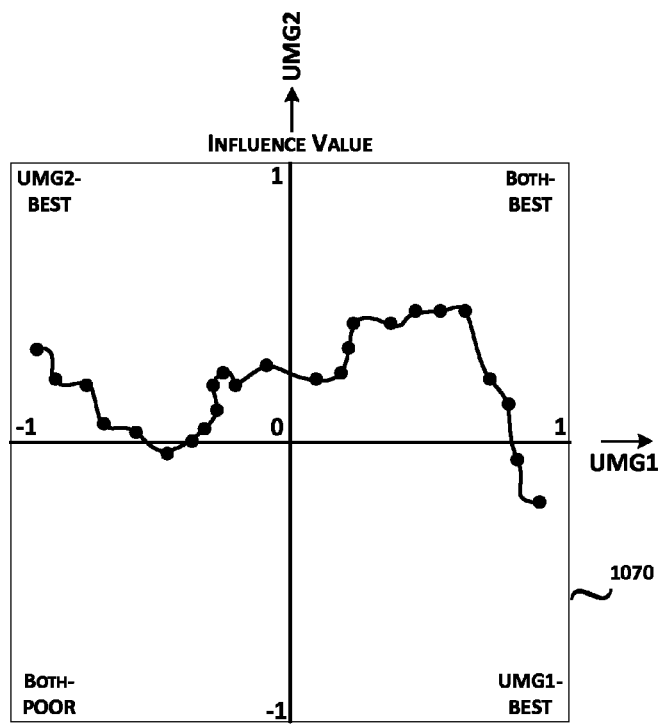
FIG. 10C: DEPICTING THE COMPARISON – 4

SYSTEM AND METHOD FOR COMPARING UNIVERSITIES BASED ON THEIR UNIVERSITY MODEL GRAPHS

1. A reference is made to the applicants' earlier Indian patent application titled "System and Method for an Influence based Structural Analysis of a University" with the application number 1269/CHE2010 filed on May 6, 2010. This application is also filed in USPTO on Sep. 1, 2010 and bears the application Ser. No. 12/873,715.

2. A reference is made to another of the applicants' earlier Indian patent application titled "System and Method for Constructing a University Model Graph" with an application number 1809/CHE/2010 and filing date of June, 28, 2010. This application is also filed in USPTO on Nov. 13, 2010 and bears the application Ser. No. 12/945,582.

3. A reference is made to yet another of the applicants' earlier Indian patent application titled "System and Method for University Model Graph based Visualization" with the application number 1848/CHE/2010 dated 30 Jun. 2010. This application is also filed in USPTO on Oct. 22, 2010 and bears the application Ser. No. 12/909,988.

4. A reference is made to yet another of the applicants' earlier Indian patent application titled "System and Method for What-If Analysis of a University based on University Model Graph" with the application number 3203CHE/2010 dated Oct. 28, 2010. This application is also filed USTPO on Feb. 12, 2011 and bears the application Ser. No. 13/025,325.

FIELD OF THE INVENTION

The present invention relates to the analysis of the information about a university in general, and more particularly, the analysis of the university based on the structural representations. Still more particularly, the present invention relates to a system and method for comparing multiple universities based on the model graphs associated with the universities.

BACKGROUND OF THE INVENTION

An Educational Institution (EI) (also referred as University) comprises of a variety of entities: students, faculty members, departments, divisions, labs, libraries, special interest groups, etc. University portals provide information about the universities and act as a window to the external world. A typical portal of a university provides information related to (a) Goals, Objectives, Historical Information, and Significant Milestones, of the university; (b) Profile of the Labs, Departments, and Divisions; (c) Profile of the Faculty Members; (d) Significant Achievements; (e) Admission Procedures; (f) Information for Students; (g) Library; (h) On- and Off-Campus Facilities; (i) Research; (j) External Collaborations; (k) Information for Collaborators; (l) News and Events; (m) Alumni; and (n) Information Resources. Several of the educational institutions differ at various levels: Number of entities, number of entity instances for an entity, and the amount of inter-dependence among entities and entity-instances. From a prospective student perspective, it is useful and important to know about (a) which university to choose; and (b) why. Prospective students need to know about the various strengths and weaknesses of a university, and more importantly, how these strengths and weaknesses compare across the other universities. Similarly, a funding agency would like to know about the various universities at a comparable level before taking a decision on funding. And so is the case with prospective faculty members who are looking at the various universities to build their academic career.

DESCRIPTION OF RELATED ART

United States Patent Application 20100153324 titled "Providing Recommendations using Information Determined for Domains of Interest" by Downs; Oliver B.; (Redmond, Wash.); Sandoval; Michael; (Kirkland, Wash.); Branzan; Claudiu Alin; (Timisoara, RO); Iovanov; Vlad Mircea; (Arad, RO); Khalsa; Sopurkh Singh; (Bellevue, Wash.) (filed on Dec. 11, 2009) describes techniques for determining and using information related to domains of interest, such as by automatically analyzing documents and other information related to a domain in order to automatically determine relationships between particular terms within the domain.

United States Patent Application 20090214117 titled "Handwriting Symbol Recognition Accuracy using Speech Input" by Ma; Lei; (Beijing, CN); Shi; Yu; (Beijing, CN); Soong; Frank Kao-ping; (Warren, N.J.) (filed on Feb. 26, 2008 and assigned to Microsoft Corporation, One Microsoft Way, Redmond, Wash. 98052, US) describes an approach wherein handwriting data and speech data corresponding to mathematical symbols are received and processed (including being recognized) into respective graphs. A fusion mechanism uses the speech graph to enhance the handwriting graph, e.g., to better distinguish between similar handwritten symbols that are often misrecognized.

United States Patent Application 20090324107 titled "Systems and Methods for Image Recognition using Graph-Based Pattern Matching" by Walch; Mark A.; (Woodbridge, Va.) (filed on Jun. 25, 2009 and assigned to Gannon Technologies Group, LLC McLean, VA) describes a method for creating a modeling structure for classifying objects in an image based on the graphs of the isolated objects.

"Graph Comparison Using Fine Structure Analysis" by Macindoe; O. and Richards; W. (appeared in the Proceedings of IEEE SocCom10, #244, 2010) describes techniques for comparing two graphs by comparing earthmovers' distances between sub-graphs within the comparable graphs.

"Empirical Comparison of Algorithms for Network Community Detection" by Leskovec; Jure, Lang; Kevin, and Mahoney; Michael (appeared in the Proceedings of the ACM WWW International conference on World Wide Web (WWW), 2010) describes comparison of two graphs that represent a large network of communities (millions of nodes) wherein the nodes represent entities and the edges, the interactions between them.

"Extension and Empirical Comparison of Graph-Kernels for the Analysis of Protein Active Sites" by Fober; Thomas, Mernberger; Marco, Melnikov; Vitalik, Moritz; Ralph, and Hullermeier; Eyke (appeared in the Proceedings of the Workshop "Knowledge Discovery, Data Mining and Machine Learning 2009", September 2009) addresses a key problem in graph-based structure analysis of defining a measure of similarity that enables a meaningful comparison of such structures.

The known systems do not address the issue of comparing multiple educational institutions based on a comprehensive modeling of these educational institutions at various levels in order to be able to compare at multiple levels. The present invention provides for a system and method for comparing universities based on their university model graphs.

SUMMARY OF THE INVENTION

The primary objective of the invention is to achieve comparing of educational institutions at various levels based on a university model graph (UMG) associated with each of these educational institutions.

One aspect of the present invention is to compare the educational institutions at UMG level.

Another aspect of the invention is to compare the educational institutions at abstract node level wherein an abstract node of a UMG stands for an entity associated with an educational institution.

Yet another aspect of the invention is to compare the educational institutions at node level wherein a node of a UMG stands for an entity instance of an entity associated with an educational institution.

Another aspect of the invention is to compare the educational institutions at sub-graph level wherein a sub-graph is a set of entities and entity instances associated with an educational institution.

Yet another aspect of the invention is to compare the educational institutions based on the base scores (also referred as assessments) associated with the corresponding UMGs.

Another aspect of the invention is to compare the educational institutions based on the influence values associated with the corresponding UMGs.

Yet another aspect of the invention is to normalize the models associated with multiple UMGs.

Another aspect of the invention is to depict the comparison results based on a plot of assessment of the nodes associated with a UMG of an educational institution with respect to the various entities of the educational institution.

Yet another aspect of the invention is to depict the comparison results based on a plot of influence value of the edges associated with a UMG of an educational institution with respect to the various entities of the educational institution.

Another aspect of the invention is to depict the comparison results based on clustering of assessments of the various nodes associated with a UMG.

Yet another aspect of the invention is to depict the comparison results based on clustering of influence values of the various nodes associated with a UMG.

Another aspect of the invention is to depict the comparison results based on a plot of assessments with respect to the two educational institutions being compared.

Yet another aspect of the invention is to depict the comparison results based on a plot of influence values with respect to the two educational institutions being compared.

In a preferred embodiment the present invention provides a system for the comparison of a plurality of universities based on a plurality of university model graphs (UMGs) of said plurality of universities to generate a plurality of comparison results based on a plurality of assessments, a plurality of influence values, and a plurality of models contained in a plurality of university model graph databases associated with said plurality of university model graphs to help in the comparative analysis of said plurality of universities, a university of said plurality of universities having a plurality of entities and a plurality of entity-instances, wherein each of said plurality of entity-instances is an instance of an entity of said plurality of entities, and a university model graph of said plurality of university model graphs associated with said university having a plurality of university models of said plurality of models, a plurality of abstract nodes, a plurality of nodes, a plurality of abstract edges, a plurality of semi-abstract edges, and a plurality of edges, with each abstract node of said plurality of abstract nodes corresponding to an entity of said plurality of entities, each node of said plurality of nodes corresponding to an entity-instance of said plurality of entity-instances, and each abstract node of said plurality of abstract nodes is associated with a model of said plurality of university models, and a node of said plurality of nodes is connected to an abstract node of said plurality of abstract nodes through an abstract edge of said plurality of abstract edges, wherein said node represents an instance of an entity associated with said abstract node and said node is associated with an instantiated model and an assessment, wherein said instantiated model is based on a model associated with said abstract node, and said assessment is computed based on said instantiated model and is a value between 0 and 1, a source abstract node of said plurality of abstract nodes is connected to a destination abstract node of said plurality of abstract nodes by a directed abstract edge of said plurality of abstract edges and said directed abstract edge is associated with an entity influence value of said plurality of influence values, wherein said entity influence value is a value between −1 and +1;

a source node of said plurality of nodes is connected to a destination node of said plurality of nodes by a directed edge of said plurality of edges and said directed edge is associated with an influence value of said plurality influence values, wherein said influence value is a value between −1 and +1;

a source node of said plurality of nodes is connected to a destination abstract node of said plurality of abstract nodes by a directed semi-abstract edge of said plurality of semi-abstract edges and said directed semi-abstract edge is associated with an entity-instance-entity-influence value of said plurality influence values, wherein said entity-instance-entity-influence value is a value between −1 and +1; and a source abstract node of said plurality of abstract nodes is connected to a destination node of said plurality of nodes by a directed semi-abstract edge of said plurality of semi-abstract edges and said directed semi-abstract edge is associated with an entity-entity-instance-influence value of said plurality influence values, wherein said entity-entity-instance-influence value is a value between −1 and +1, said system comprising, means for normalizing of said plurality of models to result in a plurality of normalized models;

means for obtaining of said plurality of assessments and said plurality of influence values based on said plurality of normalized models;

means for comparing of said plurality of universities to generate a comparison result of said plurality of comparison results based on said plurality of university model graphs; and means for displaying of said comparison result, wherein said means for generating of said comparison result further comprises of:

means for comparing of said plurality of university model graphs at said plurality of universities level to determine said comparison result;

means for obtaining of an entity of a university of said plurality of universities;

means for comparing of said plurality of university model graphs at said entity level to determine said comparison result;

means for obtaining of an entity-instance of an entity of a university of said plurality of universities;

means for comparing of said plurality of university model graphs at said entity-instance level to determine said comparison result;

means for obtaining of a plurality of sub-graph elements, wherein a sub-graph element of said plurality of sub-graph elements is an entity of a university of said plurality of universities or an entity-instance of an entity of a university of said plurality of universities;

means for comparing of said plurality of university model graphs at said plurality of sub-graph elements level to determine said comparison result;

means for obtaining of a plurality of elements, wherein an element of said plurality of elements is an entity of a university of said plurality of universities or an entity-instance of an entity of a university of said plurality of universities;

means for comparing of said plurality of university model graphs based on said plurality of assessments and said plurality of elements to determine said comparison result; and means for comparing of said plurality of university model graphs based on said plurality of influence values and said plurality of elements to determine said comparison result.

(REFER FIG. 1, FIG. 1A, FIG. 1B, FIG. 2, and FIG. 3)

BRIEF DESCRIPTION OF THE DRAWINGS

FIG. 1 provides an overview of EI Comparison System.
FIG. 1A provides an illustrative University Model Graph.
FIG. 1B provides the elements of University Model Graph.
FIG. 2 provides a Partial List of Entities of a University.
FIG. 3 provides various Kinds of Comparison of two educational institutions.
FIG. 4 provides an Approach for Comparison at UMG level.
FIG. 4A provides additional information on Approach for Comparison at UMG level.
FIG. 5 provides an Approach for Comparison at Abstract Node level.
FIG. 6 provides an Approach for Comparison at Node level.
FIG. 7 provides an Approach for Comparison at Sub-Graph level.
FIG. 8 provides an Approach for Comparison based on Base Scores and Influence Values.
FIG. 9 provides an Approach for Parametric Model Normalization.
FIG. 9A provides an Approach for Hierarchical Model Normalization.
FIG. 9B provides an Approach for Activity based Model Normalization.
FIG. 10 provides an Approach for Depiction of Comparison Results.
FIG. 10A provides a second Approach for Depiction of Comparison Results.
FIG. 10B provides a third Approach for Depiction of Comparison Results.
FIG. 10C provides a fourth Approach for Depiction of Comparison Results.

DETAILED DESCRIPTION OF THE PREFERRED EMBODIMENTS

The figures of the drawings illustrate the system and method steps of the present invention. The steps also indicate the provisions of respective means for the system functionalities.

FIG. 1 provides an overview of EI Comparison System. The system (100) allows for comparison of two or more universities and the means for the overall system functionality is as follows:

Means for obtaining of, say, two universities to be compared,
means for normalizing of the models associated with the two universities,
obtaining of the required level of comparison,
means for comparing of the two universities at the requested level, and
means for displaying of the comparison results.

The system takes a comparison request as input and generates comparison results based on the database comprising of UMG data for University 1 (110) and University 2 (120). Note that the system also is useful for comparing the multiple UMG snapshots of a single university to clearly bring out the progress of the university over a period of time.

FIG. 1a depicts an illustrative University Model Graph. 140 describes UMG as consisting of two main components: Entity Graph (142) and Entity-Instance Graph (144). Entity graph consists of entities of the university as its nodes and an abstract edge (146) or abstract link is a directed edge that connects two entities of the entity graph. Note that edge and link are used interchangeably. The weight associated with this abstract edge is the influence factor or influence value indicating nature and quantum of influence of the source entity on the destination entity. Again, influence factor and influence value are used interchangeably. Similarly, the nodes in the entity-instance graph are the entity instances and the edge (148) or the link between two entity-instances is a directed edge and the weight associated with the edge indicates the nature and quantum of influence of the source entity-instance on the destination entity-instance.

FIG. 1b provides the elements of a University Model Graph. The fundamental elements are nodes and edges. There are two kinds of nodes: Abstract nodes (160 and 162) and Nodes (164 and 166); There are three kinds of directed edges or links: Abstract links (168), links (170 and 172), and semi-abstract links (174 and 176). As part of the modeling, the abstract nodes are mapped onto entities and nodes are mapped onto the instances of the entities; Each node is associated with an entity-specific instantiated model and a node score that is a value between 0 and 1 is based on the entity-specific instantiated model; This score is called as Base Score; the weight associated with an abstract link corresponds to an entity influence value (EI-Value), the weight associated with a semi-abstract link corresponds to either an entity-entity-instance influence value (EIEI-Value) or an entity-instance-entity influence value (IEEI-Value), and finally, the weight associated with a link corresponds to an entity-instance influence value (I-Value). Note that edges and links are used interchangeably. Further, each entity is associated with a model and an instance of an entity is associated with a base score and an instantiated model, wherein the base score is computed based on the associated instantiated model and denotes the assessment of the entity instance. The weight associated with a directed edge indicates the nature and quantum of influence of the source node on the destination node and is a value between −1 and +1; This weight is called as Influence Factor.

FIG. 2 depicts a partial list of entities of a university. Note that a deep domain analysis would uncover several more entities and also their relationship with the other entities (200). For example, RESEARCH STUDENT is a STUDENT who is a part of a DEPARTMENT and works with a FACULTY MEMBER in a LABORATORY using some EQUIPMENT, the DEPARTMENT LIBRARY, and the LIBRARY.

FIG. 3 provides various Kinds of Comparison of two educational institutions.

Means and the kinds of Comparisons of two UMGs-UMG1 of EI1 and UMG2 of EI2 (300):
1. C1—Comparison at UMG level: Means for comparing of at universities level; In this case, the two UMGs are compared holistically to provide summarized comparison of the two corresponding EIs;
2. C2—Comparison at Abstract node level: Means for comparing at an entity level; Given an abstract node (or equivalently, an Entity), provide the summarized comparison at the entity level for the two corresponding EIs;
3. C3—Comparison at Node level: Means for comparing at an entity-instance level; Given a node (or equivalently, an entity-instance), provide the summarized comparison at entity-instance level for the two corresponding EIs;
4. C4—Comparison at Sub-Graph level: Means for comparing at a sub-graph (comprising of a set of sub-graph elements) level; Given a set of entities and entity-instances, compare the two sub-graphs from the two UMGs to provide detailed comparison for the two corresponding EIs;
5. C5—Means for comparison based on base scores (also referred as assessments); Comparison based only on the base score (also referred as assessment) of the nodes of the two UMGs; and
6. C6—Means for comparison based on influence values; Comparison based only on the influence value of the edges of the two UMGs.

FIG. 4 provides an Approach for Comparison at UMG level.

Means and an Approach for C1—Comparison at UMG Level (400):
Step 1: Input: UMG1 associated with EI1 and UMG2 associated with EI2;
Output: Result of Comparison;
Step 2: For each node N1J in UMG1, identify the corresponding node N2J in UMG2;
Step 3: Compute the following with respect to N1J and N2J:
  BS1J and BS2J—the base scores (assessments);
  InNI1J and InNI2J—the aggregate of the incoming negative influences;
  OutNI1J and OutNI2J—the aggregate of the outgoing negative influences;
  InPI1J and InPI2J—the aggregate of the incoming positive influences;
  OutPI1J and OutPI2J—the aggregate of the outgoing positive influences;
Step 4: 410 depicts a node N1J of UMG1 and 420 depicts a node N2J of UMG2;
  As depicted in 430, the assessment and influence values associated with N1J and N2J are combined.

FIG. 4A provides additional information on Approach for Comparison at UMG level.

Means and an Approach for C1—Comparison at UMG Level (Contd.) (450):
Step 41: Consider a CNODE with the following info:
  BS1 and BS2—Consolidated base scores based on UMG1 and UMG2 respectively;
  InNI1 and InNI2—Consolidated values of UMG1 and UMG2 respectively;
  OutNI1 and OutNI2—Consolidated values of UMG1 and UMG2 respectively;
  InPI1 and InPI2—Consolidated values of UMG1 and UMG2 respectively;
  OutPI1 and OutPI2—Consolidated values of UMG1 and UMG2 respectively;
  Add BS1J to BS1 and BS2J to BS2;
  Add InNI1J to InNI1 and InNI2J to InNI2;
  Add OutNI1J to OutNI1 and OutNI2J to OutNI2;
  Add InPI1J to InPI1 and InPI2J to InPI2;
  Add OutPI1J to OutPI1 and OutPI2J to OutPI2;
  460 depicts the CNODE;
Step 5: Means for determining of non-matching nodes for comparison at university level;
  For each of non-matching node N1J of UMG1,
  Repeat Step 4 to create CNMNODE1;
  For each of non-matching node N2J of UMG2,
  Repeat Step 4 to create CNMNODE2;
  470 depicts CNMNODE1 that is a consolidation of the nodes that are a part of UMG1 but are missing in UMG2;
  480 depicts CNMNODE2 that is a consolidation of the nodes that are a part of UMG2 but are missing in UMG1;
Step 6: Display CNODE, CNMNODE1, and CNMNODE2;
Step 7: END.

FIG. 5 provides an Approach for Comparison at Abstract Node level.

Means and an Approach for C2—Comparison at Entity Level (500):
Step 1: Input—An abstract node AN (Entity);
  Input—UMG1 associated with EI1 and UMG2 associated with EI2;
  Output—Result of Comparison;
Approach: Compute E-5 Tuple with respect to UMG1 and UMG2;
Step 2: For each instance node of AN based on UMG1,
  Determine BS, InNI, OutNI, InPI, and OutPI;
Means for determining of top-ranked elements and consolidated abstract node (CAN);
Step 3: Cluster BS associated with all the instances;
  Select the most populated cluster;
  Determine the centroid of the most populated cluster;
  Set the centroid as BS1;
  Similarly, cluster all InNI's and set the centroid of the most popular cluster as InNI1;
  Similarly, compute OutNI1, InPI1, and OutPI1;
Step 4: For each instance node of AN based on UMG2,
  Determine BS, InNI, OutNI, InPI, and OutPI;
Step 5: As in Step 3, cluster and compute BS2, InNI2, OutNI2, InPI2, and OutPI2;
Step 6: Display CAN (Comparison of AN) (520) comprising BS1, InNI1, OutNI1, InPI1, and OutPI1, and BS2, InNI1, OutnI2, InPI2, and OutpI2;
Step 7: END.

FIG. 6 provides an Approach for Comparison at Node level.

Means and an Approach for C3—Comparison at Entity-Instance Level (600):
Step 1: Input—A node N (Entity-Instance);
  Input—UMG1 associated with EI1 and UMG2 associated with EI2;
  Output—Result of Comparison;
Approach: Compute EI-5-Tuple for N with respect to UMG1 and UMG2;
Step 2: Compute the set of incoming negative influence values of N of UMG1;
Means for determining of top-ranked elements and consolidated node (CN);
Step 3: Cluster the set and determine the centroid of the most populated cluster;
  Set the centroid cInNI1;
  Similarly, compute cOutNI1 based on the set of Outgoing negative influence values;
  And, compute cInPI2 and cOutPI1;
  Obtain base score BS1 of N;

Step 4: Repeat Steps 2 and 3 to compute cInNI2, cOutNI2, cInPI2, cOutPI2, and BS2;
  620 depicts CN (Comparison of N) containing the various of the cluster centroids;
Step 5: Display the results based on CN;
Step 6: END.

FIG. 7 provides an Approach Comparison at Sub-Graph level.

Means and an Approach for C4—Comparison at Sub-Graph Level (700):
Step 1: Input—A Sub-Graph in terms of a set S of entities and entity-instances;
  Input—UMG1 associated with EI1 and UMG2 associated with EI2;
  Output—Comparison Result;
Step 2: For each entity-instance N of S of UMG1,
  Compute EI-5-Tuple;
  For each entity of AN of S of UMG1,
  Compute E-5-Tuple;
Step 3: For each AN of S of UMG1,
  Determine entity-instances that are an instance of AN;
  Compute clustered centroid based cEi-5-Tuple based on the entity-instances;
  Combine cEI-5-Tuple and E-5-Tuple to generate updated E-5-Tuple;
  At this stage, there are entities with their updated 5-tuples;
Step 4: Combine the entities in a hierarchical manner and compute the updated 5-tuples;
  At this stage, there are distinct entities (that are not related hierarchically) with the updated 5-tuples;
Step 5: Repeat Steps 2 and 3 with respect to UMG2;
Step 6: Display the results:
  720 and 740 depict a hierarchically combined entities (abstract nodes);
  Note that each of these denote 5-tuples associated with the two UMGs under consideration;
  On the other hand, 760 depicts an entity with 5-tuples that does not have a corresponding entity in UMG2. Similarly, 780 depicts an entity that does not have a corresponding entity in UMG1.
Step 7: END.

FIG. 8 provides an Approach Comparison based on Base Scores and Influence Values.

Means and an Approach for C5—Comparison Based on Base Scores and Influence Values (800):
Step 1: Input—A Set S of entities/entity-instances; Note that S can be the set of all entities and entity-instances;
  Input—UMG1 associated with EI1 and UMG2 associated with EI2;
  Output—Result of comparison;
Step 2: Determine the set of base scores SBS1 based on S and UMG1;
  Determine the set of I-values SIV1 based on S and UMG1;
  As an illustration, I-value for an entity is computed as follows:

(InPI+OutPI+InNI+OutNI)/(N1+N2+N3+N4);

Step 3: Cluster SBS1 elements and rank the clusters based on their size;
  Cluster SIV1 elements and rank the clusters based on their size;
Step 4: Repeat Steps 2 and 3 with respect to UMG2;
Step 5: Display the comparison results based on a pre-defined top-ranked clusters:
  820 depicts three top-ranked clusters related to base scores: BS11, BS12, and BS13 associated with UMG1 and BS21, BS22, and BS23 with UMG2.
  Similarly, 840 is related to depicting of top-ranked clusters related to influence values: IV11, IV12, and IV13 are associated with UMG1 while IV21, IV22, and IV23 with UMG2.
Step 6: END.

FIG. 9 provides an Approach for Parametric Model Normalization.

Means and an Approach for Model Normalization (900):
1. There are three kinds of models: Parametric model, Hierarchical model, and Activity based model;
2. One of these three models is associated with every abstract node of UMG;
3. Model normalization is the process of equalizing the models of an abstract node of UMG1 and the corresponding node of UMG2;
4. The base scores (assessments) and Influence values are recomputed based on the normalized models to ensure that the comparisons are appropriate.
5. Consider Parametric model (PM):
  A PM consists of a set of parameters (SP);
  Each parameter consists of a standard name (based on domain analysis) and a function;
  It is assumed that as the parameter names are standard, the associated functions across UMGs are equivalent for the same parameter name;
Means and Steps Involved in PM Normalization:
Step 1: Input—UMG1 associated with EI1 and UMG2 associated with EI2;
  Output—The normalized models of UMG1 and UMG2;
Step 2: Obtain a node/abstract node N1 of UMG1;
  Determine the corresponding node N2 of UMG2;
Step 3: Obtain PM1 associated with N1 and PM2 associated with N2;
Step 4: Let SP1 be the set of parameters associated with PM1;
  Similarly is SP2;
Step 5: For each parameter P1 of SP1,
  Check if an equivalent parameter P2 of SP2 can be determined;
  If Not, Remove P1;
Step 6: Remove those parameters from SP2 that did not match with any parameter of SP1;
Step 7: END.

FIG. 9A provides an Approach for Hierarchical Model Normalization.

Means and an Approach for Model Normalization (Contd.)
Means for Hierarchical Model Normalization (920):
Step 1: Input—UMG1 associated with EI1 and UMG2 associated with EI2;
  Output—The normalized models of UMG1 and UMG2;
Step 2: Obtain a node/abstract node N1 of UMG1;
  Determine the corresponding node N2 of UMG2;
Step 3: Obtain HM1 (a hierarchical model) associated with N1 and HM2 (a hierarchical model) associated with N2;
Step 4: Let SN1 be the set of nodes associated with HM1;
  Similarly is SN2;
Step 5: Obtain the root R1 of HM1, and the root R2 of HM2;
  For each child node of HM1,
  Check if an equivalent child node of R2 can be determined;
  If Not, Remove the child node from HM1;
Step 51: Remove those child nodes from R2 that did not match with any of the child nodes of R1;
Step 6: Repeat Step 5 for each of the non-root nodes of HM1;
Step 7: For each of the leaf-nodes LN1 of HM1,
  Check if an equivalent leaf node of HM2 can be determined;
  If Not Remove LN1 from HM1;

If So,

Let LN2 be the corresponding equivalent leaf-node of HM2;

Determine PM1 associated with LN1 with SP1 as the set of parameters;

Determine PM2 associated with LN2 with SP2 as the set of parameters;

Step 71: For each parameter P1 of SP1,

Check if an equivalent parameter P2 of SP2 can be determined;

If Not, Remove P1;

Step 72: Remove those parameters from SP2 that did not match with any parameter of SP1;

Step 8: END.

FIG. 9B provides an Approach for Activity based Model Normalization.

Means and an Approach for Model Normalization (Contd.)

Means for Activity Based Model Normalization (940):

Step 1: Input—UMG1 associated with EI1 and UMG2 associated with EI2;

Output—The normalized models of UMG1 and UMG2;

Step 2: Obtain a node/abstract node N1 of UMG1;

Determine the corresponding node N2 of UMG2;

Step 3: Obtain AM1 (an activity based model) associated with N1 and AM2 (an activity based model) associated with N2;

Step 4: Let SN1 be the set of nodes associated with AM1; Similarly is SN2;

Step 5: Obtain the root R1 of AM1, and the root R2 of AM2;

For each child node of AM1,

Check if an equivalent child node of R2 can be determined;

If Not, Remove the child node from AM1;

Step 51: Remove those child nodes from R2 that did not match with any of the child nodes of R1;

Step 6: Repeat Step 5 for each of the non-root nodes of AM1;

Step 7: For each of the leaf-nodes LN1 of AM1,

Check if an equivalent leaf node of AM2 can be determined;

If Not Remove LN1 from AM1;

If So,

Let LN2 be the corresponding equivalent leaf-node of AM2;

Determine PM1 associated with LN1 with SP1 as the set of parameters;

Determine PM2 associated with LN2 with SP2 as the set of parameters;

Step 71: For each parameter P1 of SP1,

Check if an equivalent parameter P2 of SP2 can be determined;

If Not, Remove P1;

Step 72: Remove those parameters from SP2 that did not match with any parameter of SP1;

Step 8: END.

FIG. 10 provides an Approach for Depiction of Comparison Results.

The means and the display of comparison result is along two dimensions (1000): X-Axis corresponds to Entities and Y-Axis corresponds to Assessment (Base score) in one case and Influence Value in the other case. Note that assessments are a value between 0 and 1 while influence values are a value between −1 and +1. The results are shown for UMG1 and UMG2 separately, and 1005 depicts the variation in Assessment values for UMG1 while 1010 shows the same for UMG2 with respect to the various entities. Similarly, 1015 shows the variation in Influence Values with respect to the various entities for UMG1 and 1020 for UMG2.

FIG. 10A provides a second Approach for Depiction of Comparison Results.

The means and the display of comparison result involves the pair of values based on assessment and influence value with respect to the various entities (1030). The pairs are plotted with respect to UMG1 and UMG2, and are clustered. 1035 shows an illustrative cluster while 1040 depicts a singleton for UMG1. Similarly, 1045 is an illustrative cluster and 1050 a singleton for UMG2.

FIG. 10B provides a third Approach for Depiction of Comparison Results.

The means and the display of comparison result is along two dimensions (1060): X-Axis corresponds to UMG1 while Y-Axis corresponds to UMG2. The assessment values for various are entities with respect to UMG1 and UMG2 are plotted. There four quadrants: Left-Bottom quadrant wherein the values close to (0,0) indicate that both UMG1 and UMG2 can improve greatly. Right-Top quadrant wherein the values close (1,1) depict that both UMG1 and UMG2 are best. The other two quadrants correspond to just one of the universities being best: Right-Bottom indicates that the UMG1 is best while Left-Top indicates that the UMG2 is best.

FIG. 10C provides a fourth Approach for Depiction of Comparison Results.

The means and the display of comparison result is along two dimensions (1070): X-Axis corresponds to UMG1 while Y-Axis corresponds to UMG2. The influence values for various are entities with respect to UMG1 and UMG2 are plotted. There four quadrants: Left-Bottom quadrant wherein the values close to (−1,−1) indicate that both UMG1 and UMG2 can improve greatly. Right-Top quadrant wherein the values close (1,1) depict that both UMG1 and UMG2 are best. The other two quadrants correspond to just one of the universities being best: Right-Bottom indicates that the UMG1 is best while Left-Top indicates that the UMG2 is best.

Thus, a system and method for comparison of two or more universities based on their respective university model graphs is disclosed. Although the present invention has been described particularly with reference to the figures, it will be apparent to one of the ordinary skill in the art that the present invention may appear in any number of systems that provide for comparison based on influence based structural representation. It is further contemplated that many changes and modifications may be made by one of ordinary skill in the art without departing from the spirit and scope of the present invention.

We claim:

1. A computer-implemented method for the comparison of two educational institutions, an educational institute 1 and an educational institute 2, using a university 1 university model graph database comprising a university model graph 1, wherein said university 1 university model graph database denotes the data associated with said educational institute 1 and a university 2 university model graph database comprising a university model graph 2, wherein said university 2 university model graph database denotes the data associated with said educational institute 2 to generate a comparison result, wherein said university 1 university model graph database comprising a plurality of 1 entities comprising a University entity, a Vice-Chancellor entity, a Division entity, a Capital-Asset entity, an Admission-Unit entity, a Department entity, a Chair-Person entity, a Faculty-Member entity, a Student entity, a Research-Student entity, a Course-Student entity, a Principle-Investigator entity, a Laboratory entity, an Equipment entity, a Staff entity, a Library entity, a Department-Library entity, a Book entity, an E-Book entity, and a Magazine entity, and a plurality of 1 entity-instances comprising a university 1, wherein said university 1 is an instance of said University entity, a vice-chancellor 1, wherein said vice-chancellor 1 is an instance of said vice-chancellor entity, a plurality of 1 divisions, wherein each of said plurality of 1 divisions is an instance of said Division entity, a plurality of 1 capital-assets, wherein each of said plurality of 1 capital-assets is an instance of said Capital-Asset entity, a plurality of 1 admission-units, wherein each of said plurality of 1 admission-units is an instance of said Admission-Unit entity, a plurality of 1 departments, wherein each of said plurality of 1 departments is an instance of said Department entity, a plurality of 1 chair-persons, wherein each of said plurality of 1 chair-persons is an instance of said Chair-Person entity, a plurality of 1 faculty-members, wherein each of said plurality of 1 faculty-members is an instance of said Faculty-Member entity, a plurality of 1 students, wherein each of said plurality of 1 students is an instance of said Student entity, a plurality of 1 research-students, wherein each of said plurality of 1 research-students is an instance of said Research-Student entity, a plurality of 1 course-students, wherein each of said plurality of 1 course-students is an instance of said Course-Student entity, a plurality of 1 principle-investigators, wherein each of said plurality of 1 principle-investigators is an instance of said Principle-Investigator entity, a plurality of 1 laboratories, wherein each of said plurality of 1 laboratories is an instance of said Laboratory entity, a plurality of 1 equipments, wherein each of said plurality of 1 equipments is an instance of said Equipment entity, a plurality of 1 staffs, wherein each of said plurality of 1 staffs is an instance of said Staff entity, a plurality of 1 libraries, wherein each of said plurality of 1 libraries is an instance of said Library entity, a plurality of 1 department-libraries, wherein each of said plurality of 1 department-libraries is an instance said of Department-Library entity, a plurality of 1 books, wherein each of said plurality of 1 books is an instance of said Book entity, a plurality of 1 e-books, wherein each of said plurality of 1 e-books is an instance of said E-Book entity, and a plurality of 1 magazines, wherein each of said plurality of 1 magazines is an instance of said Magazine entity, said university model graph 1 comprising a plurality of 1 base scores, wherein each of said plurality of 1 base scores is a value between 0 and 1, a plurality of 1 influence values, wherein each of said plurality of 1 influence values is a value between −1 and +1, a plurality of 1 abstract nodes, a plurality of 1 nodes, a plurality of 1 abstract edges, a plurality of 1 semi-abstract edges, and a plurality of 1 edges, with each abstract node of said plurality of 1 abstract nodes corresponding to an entity of said plurality of 1 entities, wherein an abstract node of said plurality of 1 abstract nodes corresponds to said Student entity, each node of said plurality of 1 nodes corresponding to an entity-instance of said plurality of 1 entity-instances and a base score of said plurality of 1 base scores, wherein a node of said plurality of 1 corresponds to a student of said plurality of 1 students and a base score 1 associated with said node denotes the assessment of said student based on said university 1 model graph database, a source abstract node of said plurality of 1 abstract nodes is connected to a destination abstract node of said plurality of 1 abstract nodes by a directed abstract edge of said plurality of 1 abstract edges and said directed abstract edge is associated with an entity influence value of said plurality of 1 influence values, a source node of said plurality of 1 nodes is connected to a destination node of said plurality of 1 nodes by a directed edge of said plurality of 1 edges and said directed edge is associated with an influence value of said plurality 1 influence values, a source node of said plurality of 1 nodes is connected to a destination abstract node of said plurality of 1 abstract nodes by a directed semi-abstract edge of said plurality of 1 semi-abstract edges and said directed semi-abstract edge is associated with an entity-instance-entity-influence value of said plurality 1 influence values, and a source abstract node of said plurality of 1 abstract nodes is connected to a destination node of said plurality of 1 nodes by a directed semi-abstract edge of said plurality of 1 semi-abstract edges and said directed semi-abstract edge is associated with an entity-entity-instance-influence value of said plurality of 1 influence values, said university 2 university model graph database comprising a plurality of 2 entities comprising said University entity, said Vice-Chancellor entity, said Division entity, said Capital-Asset entity, said Admission-Unit entity, said Department entity, said Chair-Person entity, said Faculty-Member entity, said Student entity, said Research-Student entity, said Course-Student entity, said Principle-Investigator entity, said Laboratory entity, said Equipment entity, said Staff entity, said Library entity, said Department-Library entity, said Book entity, said E-Book entity, and said Magazine entity, and a plurality of 2 entity-instances comprising a university 2, wherein said university 2 is an instance of said University entity, a vice-chancellor 2, wherein said vice-chancellor 2 is an instance of said vice-chancellor entity, a plurality of 2 divisions, wherein each of said plurality of 2 divisions is an instance of said Division entity, a plurality of 2 capital-assets, wherein each of said plurality of 2 capital-assets is an instance of said Capital-Asset entity, a plurality of 2 admission-units, wherein each of said plurality of 2 admission-units is an instance of said Admission-Unit entity, a plurality of 2 departments, wherein each of said plurality of 2 departments is an instance of said Department entity, a plurality of 2 chair-persons, wherein each of said plurality of 2 chair-persons is an instance of said Chair-Person entity, a plurality of 2 faculty-members, wherein each of said plurality of 2 faculty-members is an instance of said Faculty-Member entity, a plurality of 2 students, wherein each of said plurality of 2 students is an instance of said Student entity, a plurality of 2 research-students, wherein each of said plurality of 2 research-students is an instance of said Research-Student entity, a plurality of 2 course-students, wherein each of said plurality of 2 course-students is an instance of said Course-Student entity, a plurality of 2 principle-investigators, wherein each of said plurality of 2 principle-investigators is an instance of said Principle-Investigator entity, a plurality of 2 laboratories, wherein each of said plurality of 2 laboratories is an instance of said Laboratory entity, a plurality of 2 equipments, wherein each of said plurality of 2 equipments is an instance of said Equipment entity, a plurality of 2 staffs, wherein each of said plurality of 2 staffs is an instance of said Staff entity, a plurality of 2 libraries, wherein each of said plurality of 2 libraries is an instance of said Library entity, a plurality of 2 department-libraries, wherein each of said plurality of 2 department-libraries is an instance said of Department-Library entity, a plurality of 2 books, wherein each of said plurality of 2 books is an instance of said Book entity, a plurality of 1 e-books, wherein each of said plurality of 1 e-books is an instance of said E-Book entity, and a plurality of 2 magazines, wherein each of said plurality of 2 magazines is an instance of said Magazine entity, said university model graph 2 comprising a plurality of 2 base scores, wherein each of said plurality of 2 base scores is a value between 0 and 1 a plurality of 2 influence values, wherein each of said plurality of 1 influence values is a value between −1 and +1, a plurality of 2 abstract nodes, a plurality of 2 nodes, a plurality of 2 abstract edges, a plurality of 2 semi-abstract edges, and a plurality of 2 edges, with each abstract node of said plurality of 2 abstract nodes corresponding to an entity of said plurality of 2 entities, wherein an abstract node of said plurality of 2 abstract nodes corresponds to said Student entity, each node of said plurality of 2 nodes corresponding to an entity-instance of said plurality of 2 entity-instances and a base score of said plurality of 2 base scores, wherein a node of said plurality of 1 corresponds to a student of said plurality of 2 students and a base score 2 associated with said node denotes the assessment of said student based on said university 2 university model graph database, a source abstract node of said plurality of 2 abstract nodes is connected to a destination abstract node of said plurality of 2 abstract nodes by a directed abstract edge of said plurality of 2 abstract edges and said directed abstract edge is associated with an entity influence value of said plurality of 2 influence values, a source node of said plurality of 2 nodes is connected to a destination node of said plurality of 2 nodes by a directed edge of said plurality of 2 edges and said directed edge is associated with an influence value of said plurality 2 influence values, a source node of said plurality of 2 nodes is connected to a destination abstract node of said plurality of 2 abstract nodes by a directed semi-abstract edge of said plurality of 2 semi-abstract edges and said directed semi-abstract edge is associated with an entity-instance-entity-influence value of said plurality 2 influence values, and a source abstract node of said plurality of 2 abstract nodes is connected to a destination node of said plurality of 2 nodes by a directed semi-abstract edge of said plurality of 2 semi-abstract edges and said directed semi-abstract edge is associated with an entity-entity-instance-influence value of said plurality 2 influence values, said method performed on a computer system comprising at least one processor, said method comprising the steps of:

comparing, with at least one processor, said university 1 and said university 2 using said university model graph 1 and said university graph 2 to generate said comparison result;

determining, with at least one processor, said Student entity of said plurality of 1 entities;

comparing, with at least one processor, said university 1 and said university 2 with respect to said Student entity using said university model graph 1 and said university model graph 2;

determining, with at least one processor, a student 1 of said university model graph 1 based on said plurality of 1 students;

determining, with at least one processor, a student 2 of said university model graph 2 based on said plurality of 2 students;

comparing, with at least one processor, said student 1 and said student 2 using said university model graph 1 and said university model graph 2 to generate said comparison result;

determining, with at least one processor, a plurality of 3 entities based on said plurality of 1 entities, wherein said plurality of 3 entities comprises of said Student entity and said Library entity;

determining, with at least one processor, a plurality of 3 entity-instances based on said plurality of 1 entity-instances, wherein said plurality of 3 entity-instances comprises a plurality of 13 students of said plurality of 1 students and a plurality of 13 libraries of said plurality of 1 libraries;

determining, with at least one processor, a plurality of 4 entities based on said plurality of 2 entities, wherein said plurality of 4 entities comprises of said Student entity and said Library entity;

determining, with at least one processor, a plurality of 4 entity-instances based on said plurality of 2 entity-instances, wherein said plurality of 4 entity-instances comprises a plurality of 24 students of said plurality of 2 students and a plurality of 24 libraries of said plurality of 2 libraries;

comparing, with at least one processor, said plurality of 3 entities, said plurality of 3 entity-instances, said plurality of 4 entities, and said plurality of 4 entity-instances using said university model graph 1 and said university model graph 2 to generate said comparison result;

determining, with at least one processor, said plurality of 1 base scores associated with said university model graph 1;

determining, with at least one processor, said plurality of 2 base scores associated with said university model graph 2;

comparing, with at least one processor, said plurality of 1 base scores and said plurality of 2 base scores to generate said comparison result;

determining, with at least one processor, said plurality of 1 influence values associated with said university model graph 1;

determining, with at least one processor, of said plurality of 2 influence values associated with said university model graph 2; and comparing, with at least one processor, said plurality of 1 influence values and said plurality of 2 influence values to generate said comparison result.

2. The method of claim 1, wherein said step for comparing said university 1 and said university 2 further comprises the steps of:

determining said plurality of 1 nodes of said university model graph 1;

determining said plurality of 2 nodes of said university model graph 2;

determining a student 1 of said plurality of 1 students;

determining a node 1 of said plurality of 1 nodes, wherein said node 1 corresponds with said student 1;

determining a student 2 of said plurality of 2 students, wherein said student 2 corresponds with said student 1;

determining a node 2 of said plurality of 2 nodes, wherein said node 2 corresponds with said student 2;

determining a base score 1 of a plurality of common node 1 base scores associated with said node 1;

computing an aggregated incoming negative influence values 1 of a plurality of common node 1 aggregated incoming negative influence values based said node 1 and said plurality of 1 influence values;

computing an aggregated outgoing negative influence values 1 of a plurality of common node 1 aggregated outgoing negative influence values based said node 1 and said plurality of 1 influence values;

computing an aggregated incoming positive influence values 1 of a plurality of common node 1 aggregated incoming positive influence values based said node 1 and said plurality of 1 influence values;

computing an aggregated outgoing positive influence values 1 of a plurality of common node 1 aggregated outgoing positive influence values based said node 1 and said plurality of 1 influence values;

determining a base score 2 a plurality of common node 2 base scores associated with said node 2;

computing an aggregated incoming negative influence values 2 of a plurality of common node 2 aggregated incoming negative influence values based said node 2 and said plurality of 2 influence values;

computing an aggregated outgoing negative influence values 2 of a plurality of common node 2 aggregated outgoing negative influence values based said node 2 and said plurality of 2 influence values;

computing an aggregated incoming positive influence values 2 of a plurality of common node 2 aggregated incoming positive influence values based said node 2 and said plurality of 2 influence values;

computing an aggregated outgoing positive influence values 2 of a plurality of common node 2 aggregated outgoing positive influence values based said node 2 and said plurality of 2 influence values;

computing a consolidated base score 1 of a cnode based on said plurality of common node 1 base scores;

computing a consolidated incoming negative influence values 1 of said cnode based on said plurality of common node 1 aggregated incoming negative influence values;

computing a consolidated outgoing negative influence values 1 of said cnode based on said plurality of common node 1 aggregated outgoing negative influence values;

computing a consolidated incoming positive influence values 1 of said cnode based on said plurality of common node 1 aggregated incoming positive influence values;

computing a consolidated outgoing positive influence values 1 of said cnode based on said plurality of common node 1 aggregated outgoing positive influence values;

computing a consolidated base score 2 of said cnode based on said plurality of common node 2 base scores;

computing a consolidated incoming negative influence values 2 of said cnode based on said plurality of common node 2 aggregated incoming negative influence values;

computing a consolidated outgoing negative influence values 2 of said cnode based on said plurality of common node 2 aggregated outgoing negative influence values;

computing a consolidated incoming positive influence values 2 of said cnode based on said plurality of common node 2 aggregated incoming positive influence values;

computing a consolidated outgoing positive influence values 2 of said cnode based on said plurality of common node 2 aggregated outgoing positive influence values;

determining a plurality of non-matching 1 nodes of said plurality of 1 nodes, wherein each of said plurality of non-matching 1 nodes does not have a corresponding node 2 in said plurality of 2 nodes;

determining a cnmnode 1 based on said plurality of non-matching 1 nodes;

determining a plurality of non-matching 2 nodes of said plurality of 2 nodes, wherein each of said plurality of non-matching 2 nodes does not have a corresponding node 1 in said plurality of 1 nodes;

determining a cnmnode 2 based on said plurality of non-matching 2 nodes;

making of said cnode a part of said comparison result;

making of said cnmnode 1 a part of said comparison result; and making of said cnmnode 2 a part of said comparison result.

3. The method of claim 1, wherein said step for comparing said university 1 and said university 2 with respect to said Student entity further comprises the steps of:

determining an abstract node 1 of said plurality of 1 abstract nodes of said university model graph 1, wherein said abstract node 1 corresponds with said Student entity;

determining an abstract node 2 of said plurality of 2 abstract nodes of said university model graph 2, wherein said abstract node 2 corresponds with said Student entity;

determining a plurality of 1 student nodes of said plurality of 1 nodes based on said abstract node 1, wherein each of said plurality of 1 student nodes corresponds with a student of said plurality of 1 students;

determining a plurality of 1 student base scores based on said plurality of 1 student nodes and said plurality of 1 base scores;

determining a plurality of 1 student incoming negative influence values based on said plurality of 1 student nodes and said plurality of 1 influence values;

determining a plurality of 1 student outgoing negative influence values based on said plurality of 1 student nodes and said plurality of 1 influence values;

determining a plurality of 1 student incoming positive influence values based on said plurality of 1 student nodes and said plurality of 1 influence values;

determining a plurality of 1 student outgoing positive influence values based on said plurality of 1 student nodes and said plurality of 1 influence values;

clustering said plurality of 1 student base scores to result in a most populated 1 student base score cluster;

computing the centroid of said most populated 1 student base score cluster to result in a base score 1 of a cannode;

clustering said plurality of 1 student incoming negative influence values to result in a most populated 1 student incoming negative influence value cluster;

computing the centroid of said most populated 1 student incoming negative influence value cluster to result in an incoming negative influence value 1 of said cannode;

clustering said plurality of 1 student outgoing negative influence values to result in a most populated 1 student outgoing negative influence value cluster;

computing the centroid of said most populated 1 student outgoing negative influence value cluster to result in an outgoing negative influence value 1 of said cannode;

clustering said plurality of 1 student incoming positive influence values to result in a most populated 1 student incoming positive influence value cluster;

computing the centroid of said most populated 1 student incoming positive influence value cluster to result in an incoming positive influence value 1 of said cannode;

clustering said plurality of 1 student outgoing positive influence values to result in a most populated 1 student outgoing positive influence value cluster;

computing the centroid of said most populated 1 student outgoing positive influence value cluster to result in an outgoing positive influence value 1 of said cannode;

determining a plurality of 2 student nodes of said plurality of 2 nodes based on said abstract node 2, wherein each of said plurality of 2 student nodes corresponds with a student of said plurality of 2 students;

determining a plurality of 2 student base scores based on said plurality of 2 student nodes and said plurality of 2 base scores;

determining a plurality of 2 student incoming negative influence values based on said plurality of 2 student nodes and said plurality of 2 influence values;

determining a plurality of 2 student outgoing negative influence values based on said plurality of 2 student nodes and said plurality of 2 influence values;

determining a plurality of 2 student incoming positive influence values based on said plurality of 2 student nodes and said plurality of 2 influence values;

determining of a plurality of 2 student outgoing positive influence values based on said plurality of 2 student nodes and said plurality of 2 influence values;

clustering said plurality of 2 student base scores to result in a most populated 2 student base score cluster;

computing the centroid of said most populated 2 student base score cluster to result in a base score 2 of said cannode;

clustering said plurality of 2 student incoming negative influence values to result in a most populated 2 student incoming negative influence value cluster;

computing the centroid of said most populated 2 student incoming negative influence value cluster to result in an incoming negative influence value 2 of said cannode;

clustering said plurality of 2 student outgoing negative influence values to result in a most populated 2 student outgoing negative influence value cluster;

computing the centroid of said most populated 2 student outgoing negative influence value cluster to result in an outgoing negative influence value 2 of said cannode;

clustering said plurality of 2 student incoming positive influence values to result in a most populated 2 student incoming positive influence value cluster;

computing the centroid of said most populated 2 student incoming positive influence value cluster to result in an incoming positive influence value 2 of said cannode;

clustering said plurality of 2 student outgoing positive influence values to result in a most populated 2 student outgoing positive influence value cluster;

computing the centroid of said most populated 2 student outgoing positive influence value cluster to result an outgoing positive influence value 2 of said cannode; and making of said cannode a part of said comparison result.

4. The method of claim 1, wherein said step for comparing said student 1 and said student 2 further comprises the steps of:

determining a node 1 of said plurality of 1 nodes of said university model graph 1, wherein said node 1 corresponds with said student 1;

determining a base score 1 of said plurality of 1 base scores based on said node 1 to result in a student 1 base score of a cnnode;

determining a plurality of 1 student incoming negative influence values based on said plurality of 1 influence values and said node 1;

clustering said plurality of 1 student incoming negative influence values to result in a most populated 1 student incoming negative influence value cluster;

computing the centroid of said most populated 1 student incoming negative influence value cluster to result in a student 1 incoming negative influence value of said cnnode;

determine a plurality of 1 student outgoing negative influence values based on said plurality of 1 influence values and said node 1;

clustering said plurality of 1 student outgoing negative influence values to result in a most populated 1 student outgoing negative influence value cluster;

computing the centroid of said most populated 1 student outgoing negative influence value cluster to result in a student 1 outgoing negative influence value of said cnnode;

determine a plurality of 1 student incoming positive influence values based on said plurality of 1 influence values and said node 1;

clustering said plurality of 1 student incoming positive influence values to result in a most populated 1 student incoming positive influence value cluster;

computing the centroid of said most populated 1 student incoming positive influence value cluster to result in a 1 student incoming positive influence value of said cnnode;

determine a plurality of 1 student outgoing positive influence values based on said plurality of 1 influence values and said node 1;

clustering said plurality of 1 student outgoing positive influence values to result in a most populated 1 student outgoing positive influence value cluster;

computing the centroid of said most populated 1 student outgoing positive influence value cluster to result in a student 1 outgoing positive influence value of said cnnode;

determining a node 2 of said plurality of 2 nodes of said university model graph 2, wherein said node 2 corresponds with said student 2;

determine a base score 2 of said plurality of 2 base scores based on said node 2 to result in a student 2 base score of said cnnode;

determine a plurality of 2 student incoming negative influence values based on said plurality of 2 influence values and said node 2;

clustering said plurality of 2 student incoming negative influence values to result in a most populated 2 student incoming negative influence value cluster;

computing the centroid of said most populated 2 student incoming negative influence value cluster to result in a student 2 incoming negative influence value of said cnnode;

determine a plurality of 2 student outgoing negative influence values based on said plurality of 2 influence values and said node 2;

clustering said plurality of 2 student outgoing negative influence values to result in a most populated 2 student outgoing negative influence value cluster;

computing the centroid of said most populated 2 student outgoing negative influence value cluster to result in a student 2 outgoing negative influence value of said cnnode;

determine a plurality of 2 student incoming positive influence values based on said plurality of 2 influence values and said node 2;

clustering said plurality of 2 student incoming positive influence values to result in a most populated 2 student incoming positive influence value cluster;

computing the centroid of said most populated 2 student incoming positive influence value cluster to result in a 2 student incoming positive influence value of said cnnode;

determine a plurality of 2 student outgoing positive influence values based on said plurality of 2 influence values and said node 2;

clustering said plurality of 2 student outgoing positive influence values to result in a most populated 2 student outgoing positive influence value cluster;

computing the centroid of said most populated 2 student outgoing positive influence value cluster to result in a student 2 outgoing positive influence value of said cnnode; and making of said cnnode a part of said comparison result.

5. The method of claim 1, wherein the step for comparing said plurality of 3 entities, said plurality of 3 entity-instances, said plurality of 4 entities, and said plurality of 4 entity-instances further comprises the steps of:

determining a plurality of 3 abstract nodes of said plurality of 1 abstract nodes based on said plurality of 3 entities;

determining a plurality of 3 nodes of said plurality of 1 nodes based on said plurality of 3 entity-instances;

computing a plurality of 3 EI-5-tuples based on said plurality of 3 nodes, wherein each of said plurality of 3 EI-5-tuples is a 5-tuple comprising a base score, an incoming negative influence value, an outgoing negative influence value, an incoming positive influence value, and outgoing positive influence value, computed for a node of said plurality of 3 nodes;

computing a plurality of 3 E-5-tuples based on said plurality of 3 abstract nodes, wherein each of said plurality of 3 E-5-tuple is a 5-tuple computed for an abstract node of said plurality of 3 abstract nodes;

determining an entity 31 of said plurality of 3 entities;

determining a plurality of entity 31 instances based on said entity 31 and said plurality of 3 entity-instances, wherein an entity-instance of said plurality of entity 31 instances is an instance of said entity 31 and said entity-instance is a part of said plurality of 3 entity-instances;

determining an abstract node 31 associated with said entity 31;

determining a plurality of 31 nodes based on said plurality of entity 31 instances, wherein a node of said plurality of 31 nodes is associated with an entity-instance of said plurality of entity 31 instances;

determining a 31 E-5-tuple based on said abstract node 31;

determining a plurality of 31 EI-5-tuples based on said plurality of 31 nodes;

computing the clustered centroid of said plurality of 31 EI-5-tuple to result in a c31 EI-5-tuple;

combining said 31 E-5-tuple and said c31 EI-5-tuple to result in the updated said 31 E-5-tuple associated with said abstract node 31;

combining said plurality of 3 E-5-tuples in a hierarchical manner to result in a plurality of updated 3 E-5-tuples;

determining a plurality of 4 abstract nodes of said plurality of 2 abstract nodes based on said plurality of 4 entities;

determining a plurality of 4 nodes of said plurality of 2 nodes based on said plurality of 4 entity-instances;

computing of a plurality of updated 4 E-5-tuples based on said plurality of 4 abstract nodes and said plurality of 4 nodes;

making of said plurality of updated 3 E-5-tuples a part of said comparison result; and making of said plurality of updated 4 E-5-tuples a part of said comparison result.

6. The method of claim 1, wherein said step for comparing said plurality of 1 base scores and said plurality of 2 base scores further comprises the steps of:

clustering said plurality of 1 base scores to result in a plurality of 1 clusters;

ranking of said plurality of 1 clusters based on a plurality of sizes associated with said plurality of 1 clusters to result in a plurality of ranked 1 clusters;

selecting a plurality of selected 1 top ranked clusters based on said plurality of ranked 1 clusters and a pre-defined threshold;

clustering said plurality of 2 base scores to result in a plurality of 2 clusters;

ranking of said plurality of 2 clusters based on a plurality of sizes associated with said plurality of 2 clusters to result in a plurality of ranked 2 clusters;

selecting a plurality of selected 2 top ranked clusters based on said plurality of ranked 2 clusters and a pre-defined threshold;

making said plurality selected 1 top ranked clusters a part of said comparison result; and, making said plurality of selected 2 top ranked clusters a part of said comparison result.

7. The method of claim 1, wherein said step for comparing said plurality of 1 influence values and said plurality of 2 influence values further comprises the steps of:

clustering said plurality of 1 influence values to result in a plurality of 1 clusters;

ranking of said plurality of 1 clusters based on a plurality of sizes associated with said plurality of 1 clusters to result in a plurality of ranked 1 clusters;

selecting a plurality of selected 1 top ranked clusters based on said plurality of ranked 1 clusters and a pre-defined threshold;

clustering said plurality of 2 influence values to result in a plurality of 2 clusters;

ranking of said plurality of 2 clusters based on a plurality of sizes associated with said plurality of 2 clusters to result in a plurality of ranked 2 clusters;

selecting a plurality of selected 2 top ranked clusters based on said plurality of ranked 2 clusters and a pre-defined threshold;

making said plurality selected 1 top ranked clusters a part of said comparison result; and, making said plurality of selected 2 top ranked clusters a part of said comparison result.

8. The method of claim 1, wherein said method further comprises the steps of:
- determining a plurality of 1 base scores based on said comparison result and said university model graph 1;
- determining a plurality of 2 base scores based on said comparison result and said university model graph 2;
- determining a plurality of 1 influence values based on said comparison result and said university model graph 1;
- determining a plurality of 2 influence values based on said comparison result and said university model graph 2;
- determining said Student entity based on said plurality of 1 entities;
- determining a base score 1 based on said plurality of 1 base scores and said Student entity;
- determining a base score 2 based on said plurality of 2 base scores and said Student entity;
- depicting said base score 1 and said Student entity on a top right quadrant of a plot;
- depicting said base score 2 and said Student entity on a top left quadrant of said plot;
- determining an influence value 1 based on said plurality of 1 influence values and said Student entity;
- determining an influence value 2 based on said plurality of 2 influence values and said Student entity;
- depicting said influence value 1 and said Student entity on a right half of said plot;
- depicting said influence value 2 and said Student entity on a left half of said plot; and
- making of said plot a part of said comparison result.

9. The method of claim 8, wherein said method further comprises the steps of:
- determining a pair 1 value based on said base score 1 and said influence value 1;
- determining a pair 2 value based on said base score 2 and said influence value 2;
- depicting said pair 1 value on a right half of a plot;
- depicting said pair 2 value on a left half of said plot; and
- making of said plot a part of said comparison result.

10. The method of claim 8, wherein said method further comprises the steps of:
- depicting said base score 1 with respect to the x-axis of a plot;
- depicting said base score 2 with respect to the y-axis of said plot;
- labeling a left-bottom quadrant of said plot as "Both Universities are Poor";
- labeling a right-top quadrant of said plot as "Both Universities are Best";
- labeling a right-bottom quadrant of said plot as "University 1 is Best"; and
- labeling a left-top quadrant of said plot as "University 2 is Best".

11. The method of claim 8, wherein said method further comprises the steps of:
- depicting said influence value 1 with respect to the x-axis of a plot;
- depicting said influence value 2 with respect to the y-axis of said plot;
- labeling a left-bottom quadrant of said plot as "Both Universities are Poor";
- labeling a right-top quadrant of said plot as "Both Universities are Best";
- labeling a right-bottom quadrant of said plot as "University 1 is Best"; and
- labeling a left-top quadrant of said plot as "University 2 is Best".

* * * * *